(12) United States Patent
Sutter et al.

(10) Patent No.: US 10,998,688 B2
(45) Date of Patent: May 4, 2021

(54) ULTRA SHORT PULSE FIBER PRE-AMPLIFIER SYSTEM FOR LARGE-CORE FIBERS

(71) Applicant: TRUMPF LASER GMBH, Schramberg (DE)

(72) Inventors: Dirk Sutter, Rottweil (DE); Alexander Killi, Trossingen (DE); Aleksander Budnicki, Gundelfingen (DE); Florian Jansen, Villingen-Schwenningen (DE)

(73) Assignee: TRUMPF LASER GMBH, Schramberg (DE)

( * ) Notice: Subject to any disclaimer, the term of this patent is extended or adjusted under 35 U.S.C. 154(b) by 0 days.

(21) Appl. No.: 16/136,349

(22) Filed: Sep. 20, 2018

(65) Prior Publication Data

US 2019/0036292 A1 Jan. 31, 2019

Related U.S. Application Data

(63) Continuation of application No. PCT/EP2017/056853, filed on Mar. 22, 2017.

(30) Foreign Application Priority Data

Mar. 24, 2016 (DE) .......................... 102016105568.9

(51) Int. Cl.
*H01S 3/067* (2006.01)
*H01S 3/094* (2006.01)
(Continued)

(52) U.S. Cl.
CPC ...... *H01S 3/06754* (2013.01); *H01S 3/06758* (2013.01); *H01S 3/094011* (2013.01);
(Continued)

(58) Field of Classification Search
CPC ............ H01S 3/06754; H01S 3/06758; H01S 3/094011; H01S 3/1603; H01S 3/0057; H01S 3/06729; H01S 3/1618
See application file for complete search history.

(56) References Cited

U.S. PATENT DOCUMENTS 5,818,630 A 10/1998 Fermann et al.
6,297,903 B1 10/2001 Grubb et al.
(Continued)

FOREIGN PATENT DOCUMENTS

| CN | 101288211 A | 10/2008 |
|----|-------------|---------|
| CN | 103858293 A | 6/2014 |

(Continued)

OTHER PUBLICATIONS

"Whitepaper: Amplifying picosecond pulses using the aeroGAIN-ROD-PM85," NKT Photonics, Jan. 2013, 6 pages.
(Continued)

*Primary Examiner* — Yuanda Zhang
(74) *Attorney, Agent, or Firm* — Fish & Richardson P.C.

(57) ABSTRACT

A fiber amplification system is provided for amplifying a laser pulse signal, e.g., an oscillator signal of an oscillator device. The fiber amplification system includes a fiber pre-amplification system having a short, fundamental-mode and step-index fiber configured to pre-amplify the laser pule signal to generate a seed signal and a main amplification system having a large core fiber configured to amplify the seed signal. The short, fundamental-mode step-index fiber can have a length no longer than about 30 cm, and a mode field diameter no less than about 30 μm, e.g., in a range from 30 μm to 60 μm, as well as a high doping concentration needed to provide an absorption length no more than about 30 cm, for providing the seed signal for the large core fiber with low non-linearity.

19 Claims, 2 Drawing Sheets

(51) Int. Cl.
*H01S 3/00* (2006.01)
*H01S 3/16* (2006.01)

(52) U.S. Cl.
CPC ......... *H01S 3/0057* (2013.01); *H01S 3/06729* (2013.01); *H01S 3/1603* (2013.01); *H01S 3/1618* (2013.01)

(56) References Cited

U.S. PATENT DOCUMENTS

| | | | | |
|---|---|---|---|---|
| 7,872,794 | B1* | 1/2011 | Minelly | H01S 3/06758 359/337.13 |
| 7,876,498 | B1* | 1/2011 | Honea | H01S 3/06758 359/341.41 |
| 9,640,936 | B1* | 5/2017 | Jiang | G02B 6/02019 |
| 2007/0104431 | A1* | 5/2007 | Di Teodoro | G02B 6/02347 385/123 |
| 2007/0229940 | A1 | 10/2007 | Sintov | |
| 2012/0262781 | A1* | 10/2012 | Price | G02B 6/14 359/341.3 |
| 2013/0195126 | A1* | 8/2013 | Gapontsev | H01S 3/06708 372/6 |
| 2014/0071520 | A1* | 3/2014 | Armstrong | H01S 3/2316 359/334 |
| 2014/0185132 | A1* | 7/2014 | Saracco | H01S 3/06733 359/341.3 |

FOREIGN PATENT DOCUMENTS

| | | |
|---|---|---|
| CN | 104092087 A | 10/2014 |
| DE | 19828154 C5 | 8/2017 |
| WO | WO 2007/103898 | 9/2007 |
| WO | WO 2016/007902 | 1/2016 |

OTHER PUBLICATIONS

Eidam et al., "Fiber chirped-pulse amplification system emitting 3.8 GW peak power," Optics Express, Jan. 2011, 6 pages.

International Search Report and Written Opinion in Application No. PCT/EP2017/056853, dated Jun. 8, 2017, 16 pages (with English translation).

Limpert et al., "High-Power Ultrafast Fiber Laser Systems," IEEE Journal of Selected Topics in Quantum Electronics, Mar./Apr. 2006, 12: 233-244.

Röser et al., "131 W 220 fs fiber laser system," Optics Letters, Oct. 2005, 30: 2754-2756.

Röser et al., "Millijoule pulse energy high repetition rate femtosecond fiber chirped-pulse amplification system," Optics Letters, Dec. 2007, 32: 3495-3497.

Stutzki et al., "Tm-based fiber-laser system with more than 200 MW peak power," Optics Letters, Jan. 2015, 40: 9-12.

Zaouter et al., "Double-pass single stage short length Yb-doped rod type fibre chirped pulse amplifier system," OSA / CLEO /QELS , 2010, 2 pages.

German National Examination Report in Application No. 102016105568.9, dated Aug. 29, 2016, 12 pages (with English translation).

CN Office Action in Chinese Appln. No. 201780019392.8m dated Mar. 20, 2020, 23 pages (with English translation).

DE Office Action in German Appln. No. 102016105568.9, dated Jun. 30, 2020, 7 pages (with English translation).

* cited by examiner

ULTRA SHORT PULSE FIBER PRE-AMPLIFIER SYSTEM FOR LARGE-CORE FIBERS

CROSS REFERENCE TO RELATED APPLICATIONS

This application is a continuation of and claims priority under 35 U.S.C. § 120 from PCT Application No. PCT/EP2017/056853 filed on Mar. 22, 2017, which claims priority from German Application No. DE 10 2016 105 568.9, filed on Mar. 24, 2016. The entire contents of each of these priority applications are incorporated herein by reference.

TECHNICAL FIELD

The present disclosure relates to ultrashort pulse (USP) laser systems, and in particular to fiber amplification-based USP laser systems.

BACKGROUND

Fundamental-mode rare earth-doped fibers are used in USP laser systems to generate laser light with excellent beam quality at a high efficiency. The power scaling of such laser systems is limited by the fact that high intensities propagate in fibers over long distances, which favors the development of non-linear effects and can compromise the long-term stability of the laser system. In particular, an accumulated nonlinear phase can influence the pulse quality of fiber-based laser systems. Thus, in pulsed multi-stage USP fiber laser systems, a control (especially minimization) of the accumulated nonlinear phase is needed to avoid negative influences, for example, on the pulse quality, as far as possible, and to provide good compressibility. In this regard, see, for example, "High-Power Ultrafast Fiber Laser Systems" by J. Limpert et al., IEEE Journal of Selected Topics in Quantum Electronics, Vol. 12, No. 2, March/April 2006.

The degree of accumulated non-linearity is usually indicated by the B-integral:

$$B = \frac{2\pi}{\lambda} \int_0^L n_2(z) \frac{P(z)}{A_{\mathit{eff}}} dz$$

Therein, $\lambda$ is the wavelength of the signal light, L is the fiber length, $n_2(z)$ is the nonlinear index of the core material used, $P(z)$ is the (pulse peak) power and $A_{\mathit{eff}}$ is the effective mode field area. From a B-integral of about 2, one can detect an influence on the pulse quality after compression.

According to the B-integral, accumulated non-linearity is a function of the signal intensity in the fiber and can, thus, be reduced by reducing the (pulse peak) power, increasing the mode field area, and/or shortening the fiber length. To reduce the pulse peak power, the amplification of stretched pulses (chirped pulse amplification, CPA) is typically used.

In order to prevent the exceeding of a certain non-linearity from having a negative effect on the pulse quality, fibers are used as active amplifier media wherein the fibers are typically rear earth-doped and, in the fibers, the core area or the mode field area of the propagating fundamental-mode increases with increasing power level from one amplifier stage to the next.

For example, rod-type photonic crystal fibers (PCFs) with mode field sizes above 40 µm are used as main amplifier stages. Typically, the term large-core fiber is used starting from this mode field diameter. Such a fiber requires a high input signal intensity to ensure sufficient seed signal saturation, and the main amplifier can operate at a moderate gain of typically less than or equal to 25 dB (e. g., 17 dB for the eroGAIN-ROD-PM85 by NKT Photonics, see the White Paper "Amplifying picosecond pulses using the aeroGAIN-ROD-PM85", NKT Photonics whitepaper v 1.0 January 2013).

In order to provide such an input signal intensity, the output signal of a pulse source (e. g., a pulsed laser oscillator or a pulsed semiconductor diode) is usually pre-amplified with one or more pre-amplifier stages. However, the accumulation of a non-linear phase portion should already be avoided during the pre-amplification, because the pre-amplifier stages with typically smaller mode areas can already be burdened with non-linearities. The pre-amplification can take place, for example, in bendable photonic crystal fibers, which can typically have mode field diameters of about 30 µm and usage lengths of about 1 to 2 meters. See, for example, "Millijoule pulse energy high repetition rate femtosecond fiber chirped-pulse amplification system" by F. Röser, et al., Optics Letters, Vol. 32, No. 24, December 2007 or White Paper "Amplifying picosecond pulses using the aeroGAIN-ROD-PM85", NKT Photonics, whitepaper v 1.0 January 2013.

Furthermore, double-pass configurations that avoid a separate pre-amplifier are known. See "Double-pass single stage short length Yb-doped rod type fiber chirped pulse amplifier system" by Y. Zaouter, et al., OSA/CLEO/QELS 2010.

As mentioned above, according to the B-integral, an increase in the mode field area and a shortening of the fiber length can also be used to minimize non-linearity. However, large mode field diameters mean that the fiber can no longer be bent strongly, as otherwise the mode profile is deformed by the bending and an increase in the mode field area is prevented. In the case of PCFs, bending diameters larger than 25 cm are typically used, which requires a relatively large size of such a fiber-based USP laser system. See White Paper "Amplifying picosecond pulses using the aeroGAIN-ROD-PM85", NKT Photonics whitepaper v 1.0 January 2013.

Furthermore, U.S. Pat. No. 6,297,903 discloses an optical amplifier with an equal and a counter-propagating fiber amplifier stage. One of the fiber amplifier stages is designed as a low-noise fiber amplifier stage with a small fiber core. The other is designed as a strongly amplifying fiber amplifier stage with a small fiber core.

SUMMARY

The present disclosure provides amplification systems and in particular pre-amplification systems with a low non-linear contribution.

One aspect of the present disclosure features fiber amplification systems in which a seed signal is provided for a large-core fiber by amplifying a laser pulse signal to be amplified. The fiber amplification systems include a short, fundamental-mode step-index fiber having a mode field diameter in a range of about 30 µm and greater and a length in a range of about 30 cm and shorter for generating the seed signal from the laser pulse signal to be amplified. The fiber amplification systems also include a large-core fiber with a mode field diameter in the range of about 40 µm and larger to amplify the seed signal and to output an amplified seed signal. The seed signal can be generated with a power that is sufficient to seed the large-core fiber.

Another aspect of the present disclosure features laser systems, in particular fiber amplification-based ultrashort pulse laser systems, having a pulse source for providing a laser pulse signal to be amplified and a fiber amplification system as described above. The pulse source can be configured, for example, as an oscillator unit to generate laser pulses, for example, as a fiber-based and mode-locked oscillator or as a solid-state oscillator such as a rod, slab, or disk laser, or as a diode seed laser. The pulse source can be configured to generate a defined laser pulse train and can have a pre-amplifier that is provided downstream. The laser systems can also include a pulse length stretcher for generating a signal to be amplified that includes temporally stretched laser pulses. The laser systems can also include a compressor unit for temporal recompression of temporally stretched and amplified laser pulses.

In some embodiments, in particular for low-repetition pre-amplification, the short, fundamental-mode step-index fiber can be configured to have fiber lengths of less than or equal to 30 cm (for example, in the range of 30 cm to 10 cm or 5 cm such as in the range of 25 cm to 15 cm), and a mode field diameter greater than or equal to 30 µm, and a high doping concentration, which is required for providing an absorption length of less than or equal to 30 cm, in particular an absorption length in the range from 30 cm to 5 cm, for example in the range from 30 cm to 10 cm as well as in the range from 25 cm to 15 cm. Correspondingly, the short, fundamental-mode step-index fiber can be configured to provide the seed signal for the large-core fiber with low non-linearity. The mode field diameter of the short, fundamental-mode step-index fiber can range, for example, from 30 µm to 60 µm and in particular from 30 µm to 50 µm.

The large core fiber can be a photonic crystal fiber or a step-index fiber with a mode field diameter of 40 µm or more (e.g., in the range from 40 µm to 60 µm and especially in the range from 40 µm to 50 µm).

The use of a fundamental-mode, highly doped, very short step-index fiber in a pre-amplifier chain can significantly reduce the accumulated nonlinear phase in addition to the increased mode area. At the same time, the thus made possible provision of high seed energy and high seed power enables the efficient continuous load operation of a rod-type large-core fiber of a main amplification system. Furthermore, the shortness of the step-index fiber can significantly reduce the size of the laser system. Finally, such a step-index fiber can be monolithically integrated into other pre-amplifier systems (e. g., master oscillator fiber power amplifier (MOFPA) or diode seeded amplifier systems), thereby further improving the stability and robustness of the amplifier chain and simplifying the overall setup.

Herein, concepts are disclosed that allow at least partly improving aspects of the prior art. In particular additional features and their usefulness result from the following description of embodiments on the basis of the drawings.

DETAILED DESCRIPTION

Aspects described herein are partly based on the realization that high input power is required for efficient operation of a main amplification system that is based on a large-core fiber. For this purpose, it is proposed to use a highly rare-earths doped and fundamental-mode step-index fiber with a large core diameter (mode field diameter greater than 30 µm) in at least one (e.g., the last) pre-amplifier stage before the main amplification system. In addition to the large core of the step-index fiber, e. g., in addition to the large mode area, the non-linearity can be kept low by a usage length of the step-index fiber of 30 cm or less.

Figure 1:
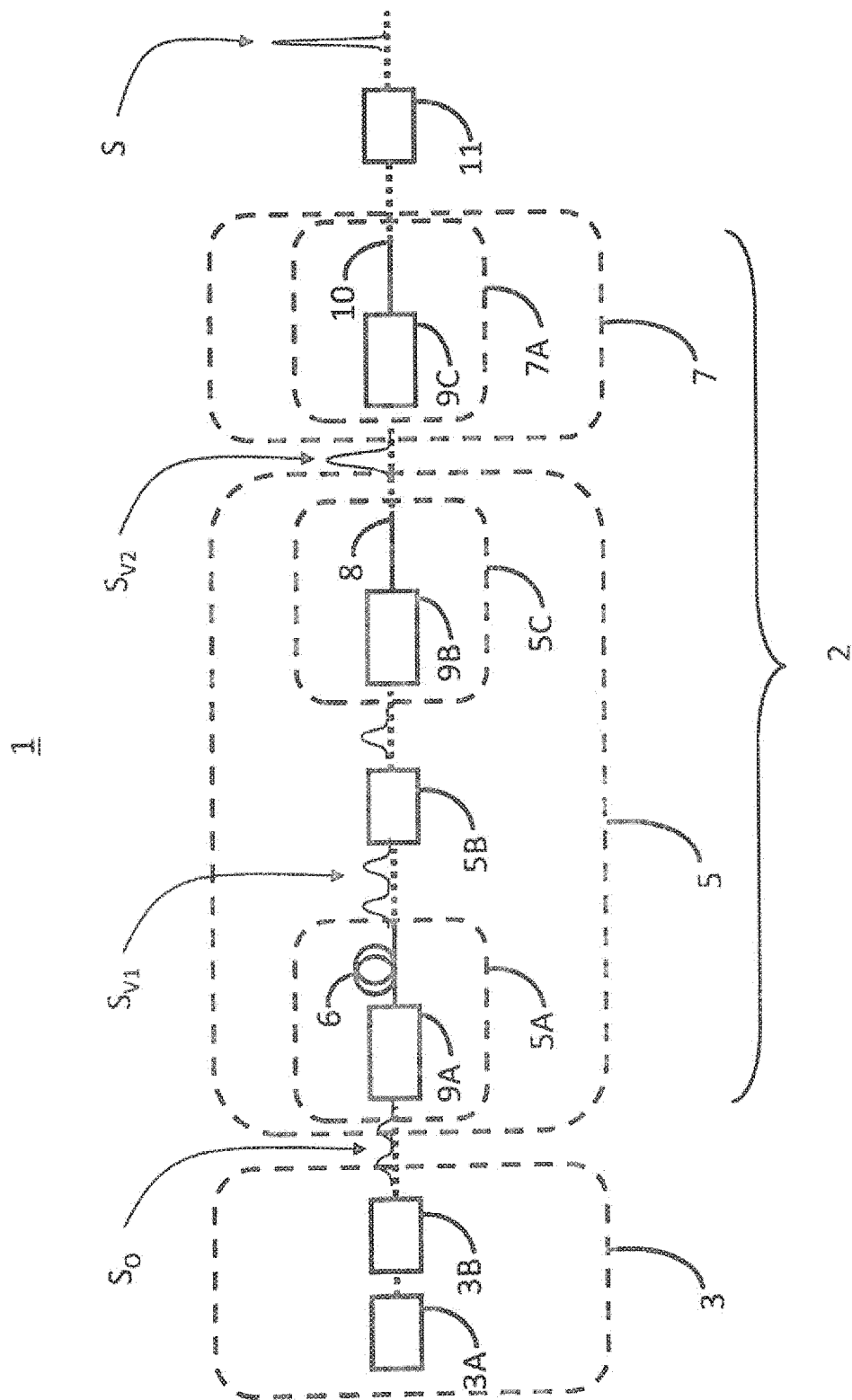
FIG. 1 is a schematic illustration of a first embodiment of a large-core fiber amplification-based ultrashort pulse laser system including a pre-amplification system having a short, fundamental-mode and highly doped step-index fiber and a main amplification system having a large-core fiber.

FIG. 1 shows an example of a USP laser system including a fiber amplification system 2 configured as a fiber amplifier chain, which can generate high pulse peak powers with a very short pulse duration from an oscillator unit 3 with a fiber pre-amplification system 5 and a main amplification system 7.

The oscillator unit 3 includes, for example, an ytterbium-doped, fiber-based and mode-locked fs-oscillator 3A for the generation of laser pulses with pulse lengths of, e. g., several 100 fs at wavelengths around 1030 nm, pulse energies in the range of, e. g., 20 pJ to 100 pJ, and repetition rates in the range of, e. g., 10 MHz to 200 MHz, such as 50 MHz.

The oscillator unit 3 can have a pulse length extender 3B, which extends the pulse length to, e. g., 100 ps to 1 ns (or up to several ns) via a dispersive fiber or dispersive optical structures (e. g., grating stretcher) and provides the laser pulses to the fiber pre-amplifier system 5 as oscillator signal $S_O$.

In the embodiment of a master oscillator fiber power amplifier (MOFPA) laser system exemplarily depicted in the figure, the oscillator signal $S_O$ of the mode-locked oscillator 3A of the oscillator unit 3 is amplified in one or more pre-amplifier stages 5A of the fiber pre-amplifier system 5 and, if necessary, spectrally and/or temporally processed.

For example, one of the pre-amplifier stages 5A is based on a single clad-single mode step-index fiber 6, which is pumped with a single mode pump unit 9A and provides an amplification factor of 20 dB to 30 dB (i.e., factor 100 to 1000) without reduction of the repetition rate.

A step-index fiber represents a waveguide in which internal total reflection results in the guiding mechanism. The core has a refractive index greater than that of the jacket. The jacket usually surrounds the core in a rotationally symmetric manner. In this early pre-amplification phase, the single-clad fiber is surrounded by a single protective jacket (coating), which is made of polymer or acrylate, for example, and which has the required larger refractive index for total reflection. To use such fibers for amplification (e.g., the fiber is correspondingly doped with rare-earth ions), pump power is coupled into the core by the pump diode laser, for example. This so-called core pumping can be performed by pumping with monomode pump radiation.

Taking into account the losses due to isolator elements, pulse energies of, e. g., up to 10 nJ, can be achieved after the first pre-amplifier stage 5A. Further highly repetitive pre-amplifier stages may follow, which can generate a first pre-amplified signal Svi with pulse energies of, e. g., up to 100 nJ. Herein, "high repetitive" means pulse repetition rates in the range of 10 MHz and higher, for example in the range up to 100 MHz or higher such as up to 1 GHz, while "low repetitive" means pulse repetition rates in the range of 10 MHz or lower, such as 1 MHz, 100 kHz or 50 kHz down to 20 kHz or 10 kHz or lower.

Alternatively or additionally, the fiber pre-amplification system 5 can also include a pulse selection device (or a pulse selector) 5B for reducing the pulse repetition rate to amplify individual selected laser pulses more efficiently. In some examples, fiber-coupled acousto-optical modulators (or free beam acousto-optical modulators—AOM) are used as the pulse selection device 5B. The use of electro-optical modulators (EOM) is also possible. At this or another point in the amplifier chain, an intervention with the aid of a pulse-forming element is also imaginable, which, for example, uses a spatial light modulator (SLM). Furthermore, e. g., the AOM (or the EOM) can be configured in such a manner that it selects and cuts the pulses and/or changes the pulse shape.

The resulting first pre-amplified signal $S_{V1}$ is coupled into a (according to the shown embodiment) low-repetitive (last) pre-amplifier stage 5C of the fiber pre-amplification system 5 and amplified therein to the seed energy required for the main amplification system 7. This low-repetitive (last) pre-amplifier stage 5C can be operated in the repetition range of the main amplification system 7 from, e. g., 20 kHz to 1 MHz (or to some MHz, for example, 10 MHz) and is explained in detail below.

The final pre-amplifier stage 5C includes a fundamental-mode, highly doped, short step-index fiber 8 with a mode field diameter (MFD) in the range of 30 μm and larger. The last pre amplifier stage 5C, for example, is based on a double clad—single mode step-index fiber that is pumped with a multi-mode pumping unit 9B and provides an amplification factor of 7 dB to 30 dB (i.e., factor 5 to 1000) at the reduced repetition rate.

For double clad fibers (also known as double core fibers or double jacket fibers), the cladding is surrounded by glass with a lower refractive index, so that the jacket forms a (high multimode) waveguide for the pump light having a lower beam quality during a so-called cladding pumping. The jacket itself is then surrounded by a (second) protective jacket.

With the fundamental-modeness (or single modeness) in fibers, laser operation takes place with only one transverse mode, e.g., generally the Gaussian mode. A distinction is made here between an analytical fundamental-mode fiber, which can only carry one mode due to the design of the waveguide, and a fiber operated in the fundamental mode (single mode operation).

In the first case, the refractive index difference is set during fiber production (measured by the numerical aperture) so that the waveguide can only conduct the fundamental mode. This is determined by the V parameter, which results from the numerical aperture (NA), the wavelength λ, and the core diameter d to $V=(2\pi/\lambda)(d/2) NA$. If the V parameter is less than 2.405, the fiber is analytically a single mode fiber. In the second case, additional measures (e. g., specially stimulating seed beam, defined bending, etc.) force the fiber to operate in its fundamental mode.

The fundamental modeness can also be determined by measuring the beam quality $M^2$ (beam propagation factor), which describes the deviation of the measuring beam from a diffraction-limited Gaussian beam. The diffraction-limited Gaussian beam has an $M^2$ of 1. In some cases, an $M^2$ of less than or equal to 1.3 can be still referred to as a fundamental-mode operation or an almost diffraction-limited beam quality.

In some cases, step-index fibers produced by modified chemical vapor deposition (MCVD) operate with an index difference of about 0.001, i.e., an NA of approx. 0.05, resulting in a maximum core diameter of about 15 μm for such a fundamental-mode fiber. Such fibers can be, for example, used as pre-amplifier fibers in the preceding pre-amplifier stages 5A. By selecting suitable materials for the core and for the jacket, large core diameters, e.g., mode field diameters of approximate 30 μm or more, can be achieved for the pre-amplifier stage 5C in line with the concepts proposed herein. Thereby, the mode field diameter (MFD) is the diameter of the fundamental mode, which is derived from the effective mode area.

The length of the fiber of the last pre-amplifier stage 5C is in the range of 0.3 m and shorter. This requires a corresponding absorption length of the pump light, after which a large part of the coupled pump power is absorbed. For this, the 13 dB absorption can be used (corresponding to an absorption of 95% of the coupled pump light). The absorption length again depends on the degree of doping and the size of the doped area. The absorption length in the case of double-core fibers is longer than in a single clad fiber, because only a part of the pump core is doped, which scales linearly with the doped area portion and also depends on the pump jet profile. The specially required brevity of the fiber together with the MFD of the underlying fundamental mode and the double core architecture requires a correspondingly high doping of the fiber.

At such high concentrations of, e.g., ytterbium ions, losses can occur, depending on the glass composition, whereby the losses increase during operation. This effect is called photo-darkening and is typically attributed to the formation of ion clusters. Photo-darkening is strongly dependent on the composition of the glass matrix in which the rare-earth ions are embedded. An exemplary fiber has saturated photo-darkening losses resulting from ytterbium doping of less than 5%.

A second pre-amplified signal $S_{V2}$ after the last pre-amplifier stage 5C is fed to a main amplifier unit 7A of the main amplification system 7. The second pre-amplified signal $S_{V2}$ of the pre-amplifier stage 5C can be coupled into the main amplifier unit 7A via free beam coupling (for the reduction of accumulated nonlinear phase), for example. The main amplifier unit 7A can be operated in the fundamental mode, effectively in fundamental mode or multi-mode.

The main amplifier unit 7A, for example, is based on a multi-mode pumped active fiber 10, which is configured as a rod-shaped PCF or as another short step-index fiber, for example, as a double clad—single mode fiber. The short step-index fiber has an even larger core (e. g., MFD of 40 μm or larger) than that of the pre-amplifier stage 5C being a substantially linear fiber element (rod-shaped). In PCF structures, refractive index differences or more complex guide structures are generated using, for example, air holes, whereby typically a better control over the index is given. This can be particularly advantageous for larger nuclei. For example, the main amplifier unit 7A is pumped with a multi-mode pump unit 9C.

After a final amplification to pulse energies of, e. g., 100 μJ or more (e. g., up to the mJ range), the laser pulses can be recompressed to pulse lengths of several 100 fs to several 100 ps in a compressor unit 11. Recompression can be carried out, for example, with a grid compressor as schematically shown in the figure. In the downstream beam path subsequently positioned optical dispersive elements can also be taken into account. Thereafter, the generated and amplified laser pulses (as a processing beam S) are provided, e. g., for workpiece processing in a machine tool (not shown) for micro material processing with the desired pulse length and corresponding peak pulse power. Further amplification in other amplifier systems or further processing of the pulse train is also possible.

Figure 2:
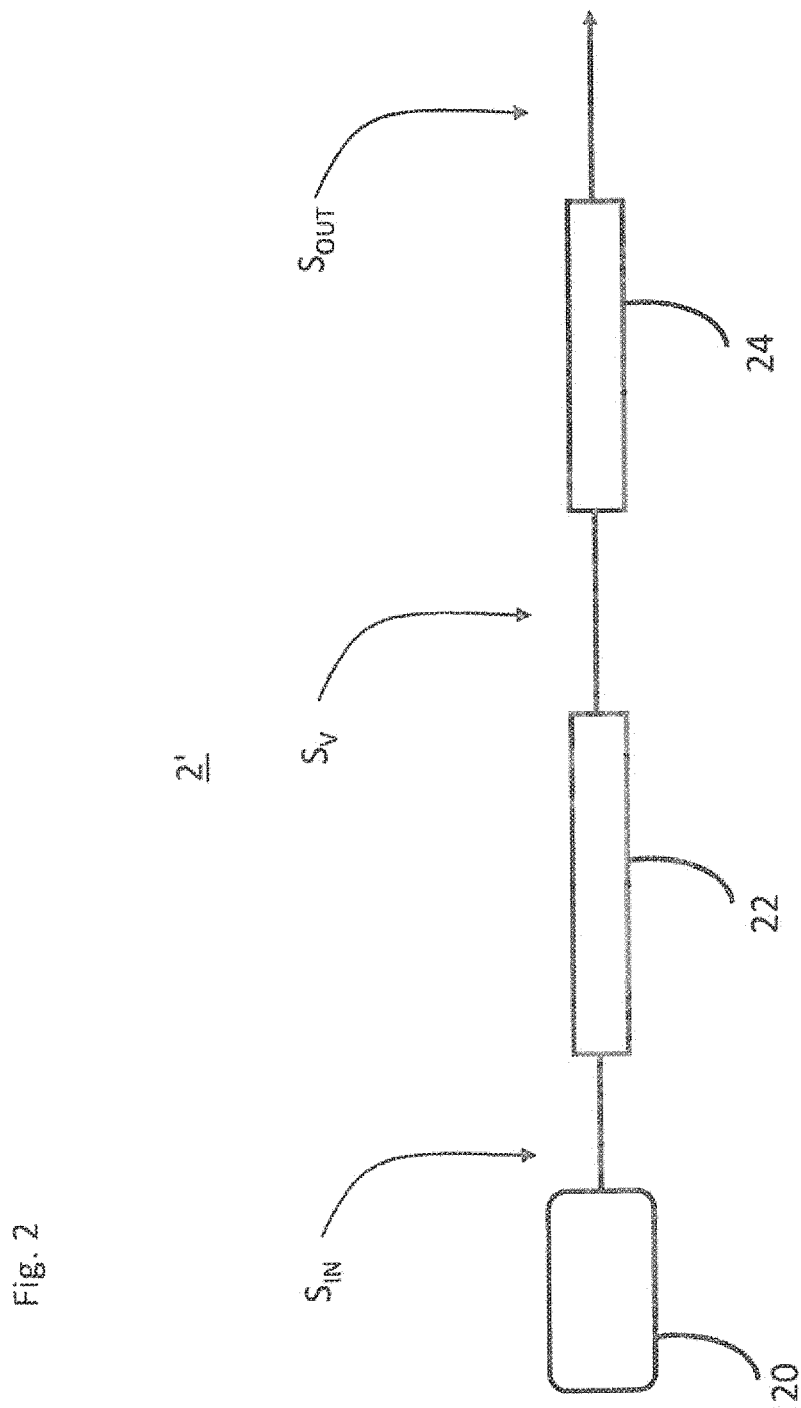
FIG. 2 is a schematic illustration of another embodiment of an amplification system for large-core fiber amplifiers based on a highly doped step-index fiber.

A further embodiment of a pre-amplification concept based on a highly doped step-index fiber is shown schematically in FIG. 2. A fiber amplification system 2' includes a pulse source 20 (optional), a short step-index fiber 22, a large-core fiber 24, and a compressor unit (optional).

Pulse source 20 provides a laser pulse signal $S_{IN}$ to be amplified. The fiber amplification system 2' can be configured such that a seed signal $S_V$ for the large-core fiber 24 is generated by amplifying the laser pulse signal $S_{IN}$ to be amplified.

For this purpose, the short step-index fiber 22 can have a mode field diameter in the range of 30 µm and greater, and a length in the range of 30 cm and shorter. It generates the seed signal $S_V$ from the laser pulse signal $S_{IN}$ to be amplified, whereby the seed signal $S_V$ is generated with a power sufficient to seed the large-core fiber 24. The seed signal $S_V$ has essentially no or an acceptable accumulated nonlinear phase.

The large-core fiber 24 has a mode field diameter in the range of 40 µm and larger for amplifying the seed signal $S_V$ and outputs an amplified laser pulse signal $S_{OUT}$, which can then be recompressed in time in the compressor unit. The amplified laser pulse signal $S_{OUT}$ also has preferably no or an acceptable accumulated nonlinear phase.

The coupling into the various step-index fibers disclosed herein can generally take place, e.g., by free beam coupling (to avoid an accumulation of a non-linear phase in passive transport fibers) or fiber-coupled (e. g., spliced). The short step-index fibers can also be pumped fiber-coupled or by free beam optics. The pumping can be performed co-propagating and/or counter-propagating to the signal beam.

The approach disclosed herein for reducing the accumulation of non-linear phase in at least one (e.g., the last) pre-amplifier stage before the main amplifier implements the use of a fundamental-mode, highly rare earth-doped step-index fiber with a large core diameter (MFD, e.g., greater than 30 µm). In addition to the large core (e. g., due to the high rare earth (e.g., Yb3+) concentration), a short fiber usage length (e.g., in the range of 30 cm and shorter) also reduces the B-integral of the fiber pre-amplification system. This allows a seed power of up to a few Watt (or up to 100 W or more) and seed pulse energies up to the µJ range to be provided, so that the main amplifier can be operated efficiently with moderate amplification.

As recognized herein, the special combination of parameters of the amplifier fiber for the (last) pre-amplification (fiber lengths of 30 cm or less, and MFD values greater than or equal to 30 µm, e.g., in the range from 30 µm to 60 µm and in particular in the range from 30 µm to 50 µm together with a high doping concentration required to provide an absorption length of less than 30 cm) thus permits the low, non-linearity supply of a seed signal for the main amplifier in a compact and stable setup of an amplifier chain. The concept of seed technology disclosed herein can thus optimize fiber-based USP laser systems for industrial use.

In addition to the ytterbium-doped fibers explicitly mentioned herein as exemplary rare-earth doping, thulium-doped and erbium-doped fibers in the µm wavelength range and holmium-doped fibers in the 2 µm wavelength range can also be used. In addition to the fiber oscillator explicitly mentioned herein, oscillator types such as solid-state oscillators (e.g., rod, slab or disk lasers) or laser diodes can also be used for generating the seed signal $S_O$.

In some embodiments, the seed signal $S_V$ in particular has an associated B-integral in the range of 30 rad and smaller (for example, 5 rad and smaller or, for example, 3 rad and smaller), and/or the B-integral of the amplified laser pulse signal $S_{OUT}$ is in the range of 30 rad and smaller (for example, 5 rad and smaller or, for example, 3 rad and smaller).

OTHER EMBODIMENTS

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A fiber amplification system comprising:
   a short, fundamental-mode step-index fiber having a mode field diameter no less than about 30 µm and a length no longer than about 30 cm and being configured for generating a seed signal from a laser pulse signal to be amplified and for generating the seed signal with a gain factor in a range from about 7 dB to 30 dB; and
   a large-core fiber having a mode field diameter no less than 40 µm and configured for amplifying the seed signal and outputting the amplified seed signal.

2. The fiber amplification system of claim 1, wherein the short, fundamental-mode step-index fiber is highly doped such that it has a length of less than or equal to 30 cm.

3. The fiber amplification system of claim 2, wherein the length of the short, fundamental-mode step-index fiber substantially corresponds to an absorption length associated with 13 dB absorption with respect to a pumping light used for amplifying the laser pulse signal.

4. The fiber amplification system of claim 1,
   wherein the short, fundamental-mode step-index fiber has a V parameter no more than 2.405, and
   wherein the V parameter is expressed as:

$$V = (2\pi/\lambda)(d/2)NA,$$

where NA represents a numerical aperture of the step-index fiber, λ represents a wavelength of the laser pulse signal, and d represents a core diameter of the step-index fiber.

5. The fiber amplification system of claim 1, wherein a beam quality $M^2$ at an output of the short, fundamental-mode step-index fiber is less than or equal to 1.3.

6. The fiber amplification system of claim 1, wherein the short, fundamental-mode step-index fiber comprises a double clad-single mode step-index fiber.

7. The fiber amplification system of claim 6, wherein the double clad-single mode step-index fiber is configured for generating the seed signal at a reduced repetition rate in a range from about 20 kHz to 10 MHz.

8. The fiber amplification system of claim 6, wherein the double clad-single mode step-index fiber is configured for multi-mode pumping.

9. The fiber amplification system of claim 1, comprising a fiber pre-amplification system, wherein the short, fundamental-mode step-index fiber is configured as a highly doped step-index fiber pre-amplifier stage of the fiber pre-amplification system.

10. The fiber amplification system of claim 9, comprising a main amplification system, wherein the large-core fiber is configured as a part of the main amplification system.

11. The fiber amplification system of claim 9,
wherein the highly doped step-index fiber pre-amplifier stage is configured as a low-repetition pre-amplifier stage, and
wherein the fiber pre-amplification system further comprises:
at least one high repetition pre-amplifier stage configured to amplify the laser pulse signal to provide a first pre-amplified signal for the low-repetition pre-amplifier stage, and
at least one pulse selector arranged at an input of the low-repetition pre-amplifier stage for reducing the pulse repetition rate.

12. The fiber amplification system of claim 9,
wherein the fiber pre-amplification system further comprises
a first pre-amplifier stage configured to amplify the laser pulse signal to provide a first pre-amplified signal for the low-repetition pre-amplifier stage; and
at least one pulse selection device configured to reduce a pulse repetition rate and arranged at the input of the first pre-amplifier stage, and
wherein the step-index fiber pre-amplifier stage is configured to amplify the first pre-amplified signal.

13. The fiber amplification system of claim 9, wherein the fiber pre-amplification system further comprises at least one of a high repetition pre-amplifier stage and a low repetition pre-amplifier stage that are disposed in a beam path on an in-coupling side of the short, fundamental-mode step-index fiber.

14. The fiber amplification system of claim 9,
wherein the fiber pre-amplification system further comprises at least one pre-amplifier stage configured to amplify the laser pulse signal to provide a first pre-amplified signal for the short, fundamental-mode step-index fiber, and
wherein the at least one pre-amplifier stage comprises a single clad-single mode step-index fiber configured to generate the first pre-amplified signal with a second gain factor in the range of about 7 dB to 30 dB.

15. The fiber amplification system of claim 1,
wherein the large-core fiber comprises a main amplifier fiber configured as a photonic crystal fiber or a step-index fiber, and has a mode field diameter of no less than about 40 µm, and
wherein the large-core fiber is rod-shaped as a substantially linear fiber element, and configured for a fundamental-mode operation or a multimode operation.

16. The fiber amplification system of claim 1, wherein the short, fundamental-mode step-index fiber is configured with a fiber length in a range from about 30 cm to 5 cm, with a mode field diameter in a range from about 30 µm to 60 µm, and with a high doping concentration for providing an absorption length in a range from about 30 cm to 5 cm, for providing the seed signal for the large-core fiber.

17. A laser system comprising:
a pulse source configured to provide a laser pulse signal to be amplified; and
a fiber amplification system for amplifying the laser pulse signal, comprising:
a short, fundamental-mode step-index fiber having a mode field diameter no less than about 30 µm and a length no longer than about 30 cm and being configured for generating a seed signal from the laser pulse signal and for generating the seed signal with a gain factor in a range from about 7 dB to 30 dB; and
a large-core fiber having a mode field diameter no less than about 40 µm and configured for amplifying the seed signal and outputting the amplified seed signal.

18. The laser system of claim 17, further comprising at least one of:
a pulse length stretcher configured to temporally stretch a pulse length of laser pulses in the laser pulse signal and provide the stretched laser pulses to the fiber amplification system for amplification,
a compressor unit configured for temporal compression of the temporally stretched and amplified laser pulses, and
at least one pump laser system for pumping the fibers of the fiber amplification system.

19. The laser system of claim 17,
wherein the pulse source comprises one of a fiber-based oscillator, a mode-locked oscillator, a solid-state oscillator, and a diode seed laser, and
wherein the pulse source is configured to generate a defined laser pulse train.

* * * * *